US010661608B2

(12) United States Patent
Spinnler

(10) Patent No.: US 10,661,608 B2
(45) Date of Patent: May 26, 2020

(54) TREAD FOR AN EARTHMOVER TIRE, COMPRISING INCISED BLOCKS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Olivier Spinnler, Clermont-Ferrand (FR)

(73) Assignees: COMPAGNIE GENERALE DES ETABLISSEMENTS MICHELIN, Clearmont-Ferrand (FR); MICHELIN RECHERCHE ET TECHNIQUE, S.A., Granges-Paccot (CH)

(*) Notice: Subject to any disclaimer, the term of this patent is extended or adjusted under 35 U.S.C. 154(b) by 533 days.

(21) Appl. No.: 15/528,144

(22) PCT Filed: Nov. 20, 2015

(86) PCT No.: PCT/EP2015/077200
§ 371 (c)(1),
(2) Date: May 19, 2017

(87) PCT Pub. No.: WO2016/083255
PCT Pub. Date: Jun. 2, 2016

(65) Prior Publication Data
US 2017/0326918 A1    Nov. 16, 2017

(30) Foreign Application Priority Data
Nov. 25, 2014 (FR) ..................... 14 61438

(51) Int. Cl.
*B60C 11/12* (2006.01)
*B60C 11/11* (2006.01)
*B60C 11/13* (2006.01)

(52) U.S. Cl.
CPC ........... *B60C 11/1218* (2013.01); *B60C 11/11* (2013.01); *B60C 11/1263* (2013.01);
(Continued)

(58) Field of Classification Search
CPC . B60C 11/1218; B60C 11/12; B60C 11/1263; B60C 11/1369; B60C 2200/065; B60C 11/1281
See application file for complete search history.

(56) References Cited

U.S. PATENT DOCUMENTS

2001/0022209 A1* 9/2001 Chaen .................. B60C 11/11
152/151
2004/0211502 A1* 10/2004 Ono ..................... B60C 11/00
152/209.19

FOREIGN PATENT DOCUMENTS

EP    1127715 A2    8/2001
FR    1452048 A     9/1966
(Continued)

OTHER PUBLICATIONS

International Search Report corresponding to PCT/US2017/019905 dated May 15, 2017.

*Primary Examiner* — Robert C Dye
*Assistant Examiner* — Farah Taufiq
(74) *Attorney, Agent, or Firm* — Dickinson Wright PLLC; Steven Hurles

(57) ABSTRACT

The tread comprises a plurality of blocks, each block being delimited by transverse or oblique grooves and circumferential grooves. Each block is provided with a sipe which has three branches. The branches have common ends. A first branch is oriented in a transverse or oblique direction. A second branch and a third branch each open when new into a transverse groove delimiting the block. The angle formed between the first and second branches is 100 to 125 degrees, and the angle formed between the first and the third branches (Continued)

is 100 to 125 degrees. After wear, each sipe represents between 45% and 70% of the total wearable thickness, such that the lengths of the three branches measured on the new tread surface, L1', L2', L3' respectively, are shorter than the lengths L1, L2, L3 respectively measured on the tread surface when new.

10 Claims, 2 Drawing Sheets

(52) U.S. Cl.
    CPC ....... *B60C 11/13* (2013.01); *B60C 2011/1245* (2013.01); *B60C 2200/065* (2013.01)

(56) References Cited

FOREIGN PATENT DOCUMENTS

| | | | |
|---|---|---|---|
| FR | 2997043 | A1 | 4/2014 |
| JP | 2011011627 | A | 1/2011 |
| JP | 2011011696 | A | 1/2011 |
| WO | 2012131081 | A1 | 10/2012 |
| WO | 2014102136 | A1 | 7/2014 |

* cited by examiner

TREAD FOR AN EARTHMOVER TIRE, COMPRISING INCISED BLOCKS

CROSS-REFERENCE TO RELATED APPLICATION

The present invention claims priority to PCT International Patent Application Serial No. PCT/EP2015/077200 filed Nov. 20, 2015 entitled "Tread For An Earthmover Tire, Comprising Incised Blocks," which claims the benefit of FR Patent Application Serial No. 1461438 filed Nov. 25, 2014, the entire disclosures of the applications being considered part of the disclosure of this application and hereby incorporated by reference.

BACKGROUND OF THE INVENTION

1. Field of the Invention

The present invention relates to tires for construction plant vehicles and notably to the designs of the tread patterns of the treads of these tires.

2. Prior Art

In order to ensure satisfactory grip for traction and for braking, it is necessary to form on a tread of a tire a tread pattern, this tread pattern comprising a collection of cuts and voids of greater or lesser complexity. These cuts and voids form a tread pattern design both on the surface referred to as the tread surface intended to come into contact with the ground, and within the thickness of the tread.

Patent document FR 1452048 in particular explains the formation of wide cuts (referred to as "grooves") and of narrow cuts (referred to as "sipes"). A sipe has a width suitable for the opposing faces that delimit it being able to come at least partially into contact as the sipe enters the contact patch in which the tire is in contact with the roadway. Thus it is possible to benefit from the presence of edge corners formed at the intersection of the cuts with a tread surface while at the same time maintaining sufficient tread stiffness once the opposing walls are in contact with one another at least in part.

Documents WO 2012/131081 A1, WO 2014/102136 A1, EP1127715 A2 also form part of the prior art.

The treads for tires intended for construction plant vehicles generally have significant wearable thicknesses of material, which means to say thicknesses at least equal to 60 mm. Under the recommended conditions of use, these large thicknesses can generate increases in temperature as a result of the cyclic deformations brought about by running. In order to obtain performance that remains good over time, it is necessary to reduce this operating temperature, at least when the tread is new, by increasing the ventilation of the regions of the tread most likely to experience high rises in temperature.

Definitions:

A radial direction in this document means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

An equatorial midplane is a plane perpendicular to the axis of rotation and passing through those points of the tire that are radially furthest away from the said axis. For a tread, this plane divides the tread widthways into two halves of equal widths.

A block is a raised element formed on the tread and limited by voids or grooves and comprising lateral walls and a contact face intended to come into contact with the roadway.

In this document, a cut generically denotes either a groove or a sipe and corresponds to the space delimited by walls of material that face one another and are distant from one another by a distance (referred to as the "width of the cut"). It is precisely this distance that differentiates a sipe from a groove; in the case of a sipe, this distance is appropriate for allowing the opposing walls delimiting the said sipe to come into at least partial contact at least when the sipe comes into contact with the roadway. In the case of a groove, the walls of this groove cannot come into contact with one another under normal running conditions.

A tread has a maximum thickness of wearable material that can be worn away during running; once this maximum thickness has been reached, the tire may be replaced by a new tire or indeed retreaded, which means to say provided with a new tread. The volume of wearable material corresponds, in the case of the tires of the disclosure, to the quantity of material situated between the tread surface when new and a virtual surface parallel to the tread surface when new and passing through the innermost points of the cuts formed in the tread.

Axially towards the outside means a direction oriented towards the outside of the internal cavity of the tire.

The usual running conditions of the tire or conditions of use, are those defined by the E.T.R.T.O. standard; these conditions of use specify the reference inflation pressure corresponding to the load-bearing capability of the tire as indicated by its load index and speed rating. These conditions of use may also be referred to as "nominal conditions" or "working conditions".

SUMMARY OF THE INVENTION AND ADVANTAGES

The present disclosure seeks to improve the grip performance of very thick treads while at the same time limiting the increase in operating temperature in the hottest regions of the tire.

To that end, the subject of the disclosure is a tread for a tire for a construction plant vehicle, this tire comprising a carcass reinforcement surmounted by a crown reinforcement. The tread according to the disclosure surmounts the crown reinforcement and comprises a surface—referred to as tread surface—which is intended to come into contact with the ground when the tire is being driven on. This tread has a total thickness of wearable material at least equal to 60 mm and comprising on its tread surface a tread pattern design formed of a plurality of blocks of material, each block being delimited by transverse or oblique grooves—which means to say grooves making an angle at least equal to 45 degrees with the circumferential direction—and grooves of circumferential overall orientation. A plurality of blocks are provided with a sipe having three incised branches these three incised branches having one end in common, this end forming a well extending into the thickness of the tread, a first branch being oriented in a transverse or oblique direction, a second branch and a third branch each opening when new into a transverse groove delimiting the said block.

This tire is such that the angle formed between the first branch and the second branch is at least equal to 100 degrees and at most equal to 125 degrees and such that the angle formed between the first branch and the third branch is at least equal to 100 degrees and at most equal to 125 degrees.

Furthermore, after wear representing between 45% and 70% of the total wearable thickness, the lengths of the three incised branches measured on the new tread surface, L1', L2', L3' respectively, are shorter than the lengths L1, L2, L3 respectively measured on the tread surface when new, and the reductions in length are at least equal to 30% of the respective initial lengths.

The branches of each three-branched sipe incision have a width suitable for being able to close up at least in part as they come into contact with the ground with which the tread is in contact. These widths may reasonably be chosen as being at least equal to 8% of the wearable thickness of material and at most equal to 16% of this same thickness.

For preference, the reductions in length are at least equal to 30% and at most equal to 60% of the respective initial lengths of each branch.

For preference, after wear representing more than 95% of the total wearable thickness, the lengths of the three branches measured on the new tread surface, respectively L1", L2", L3" are shorter than the initial lengths—L1, L2, L3 respectively—measured on the tread surface when new.

For preference, the first branch comprises, on the tread surface when new, two ends one of which is common to the other two branches and another of which is situated axially between the common end and the equatorial midplane of the tire.

Advantageously, if the first branch does not open into a groove, it is provided at its end not common to the other two branches with a well of a diameter greater than the width of the first branch so as to reduce the stresses at this end and encourage the removal of heat produced in the tread during running. This well extends depthwise at least as far as the reduction in length of the first sipe incision.

In the latter instance, and to encourage the removal of the heat generated in the tread, it is advantageous for each block to be provided with, in addition to the three-branch sipe as described hereinabove, a well of a depth at least equal to 30% of the total wearable thickness, this well not being connected to the three-branch sipe.

In an advantageous alternative form of the disclosure, the depths from which the lengths of the second and third sipe incisions are reduced differ from one another in order to increase the movement of air in these sipe incisions so as to increase the removal of heat.

For preference, when new, the three branches of the sipe according to the disclosure interconnect at a well with a maximum surface dimension at least equal to 10% and at most equal to 20% of the circumferential length of the block. (Length measured in the circumferential direction). Advantageously, this well has a cross section that decreases with depth so as to limit the possibility of trapping foreign bodies liable to damage the tire provided with this tread.

In order to improve the locking-together of the walls that delimit the branches of the sipe according to the disclosure, it is judicious to plan for the presence of undulations or zigzags on the walls of these branches. For preference, the second and third branches are provided with undulations in two directions whereas the first branch is provided with undulations in the depthwise direction.

Further features and advantages of the disclosure will become apparent from the description given hereinafter with reference to the attached drawings which, by way of non-limiting examples, show some embodiments of the subject-matter of the disclosure.

DETAILED DESCRIPTION OF THE ENABLING EMBODIMENTS

To make the figures easier to read, the same reference signs are used for describing alternative forms of the disclosure where these reference signs refer to elements that are the same in nature whether structurally or indeed functionally.

Figure 1:
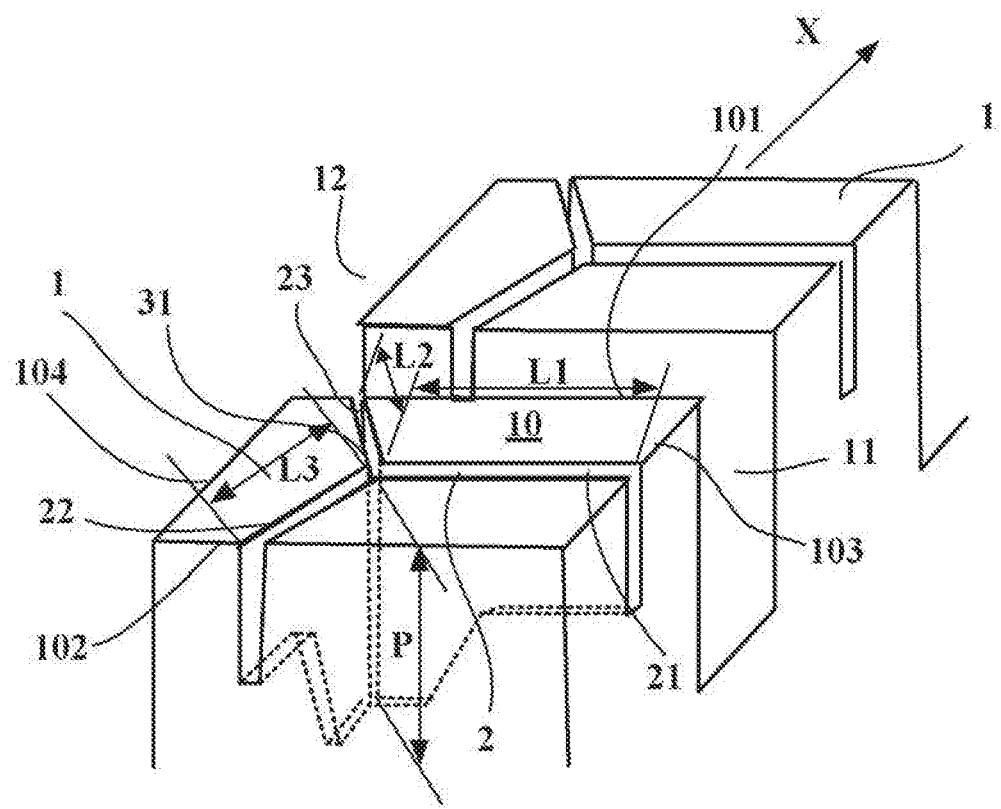
FIG. 1 depicts a partial view of a tread according to the disclosure.

FIG. 1 depicts a partial view of a tread of a construction plant tire according to the disclosure.

This tire comprises a carcass reinforcement surmounted by a crown reinforcement the latter itself being surmounted by a tread of which a surface—referred to as tread surface—is intended to come into contact with the ground when the tire is being driven on.

This tread has a variable thickness of wearable material at least equal to 60 mm. This thickness corresponds to the thickness of material between the tread surface when new and a level corresponding to maximum wear. This tread on its tread surface comprises a tread pattern design, this design being formed of a plurality of blocks 1 of material, each block 1 being delimited by transverse grooves 11—which means to say grooves making an angle equal to 90° with the circumferential direction (indicated by the arrow X) and grooves 12 of circumferential orientation.

This FIG. 1 depicts two blocks 1 each comprising a contact face 10 forming part of the tread surface of the tread. Each contact face 10 of each block 1 is delimited by lateral edge corners and leading and trailing edge corners. The lateral edge corners 103, 104 border the circumferential grooves delimiting the blocks. The leading edge corner 101 corresponds to the frontal edge corner that is first to come into contact with the ground, while the trailing edge corner 102 corresponds to the rear edge corner of the contact face that is last to come into contact.

Opening onto the contact face 10 of each block 1 is a three-branched sipe 2, the three branches 21, 22, 23 having in common one end that forms a radial well 31 of a depth P corresponding to the maximum depth of the sipe 2. A first branch 21 is oriented in a transverse direction parallel to the direction of the transverse grooves 11 delimiting the block 1, a second branch 22 and a third branch 23 each when new open into a transverse groove delimiting the block.

In this alternative form, the angle formed between the first branch 21 and the second branch 22 of the sipe 2 is at least equal to 100 degrees and at most equal to 125 degrees and the angle formed between the first branch 21 and the third branch 23 is at least equal to 100 degrees and at most equal to 125 degrees.

In this alternative form, the three branches of the sipe 2 open when new into the grooves. The first branch has a length L1 measured on the contact face when new, while the second and third branches have lengths L2 and L3 respectively.

Figure 2:
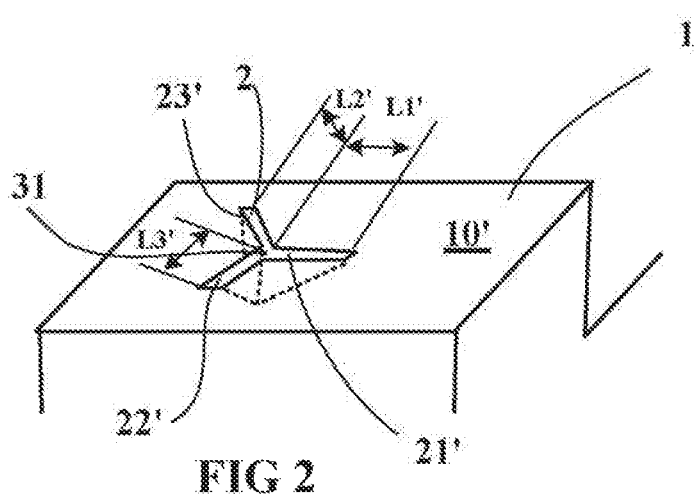
FIG. 2 depicts a partial view of a tread after partial wear.

After wear representing between 45% and 70% of the total wearable thickness measured between the tread surface when new and a wear limit of the tread, and as shown in FIG. 2, the sipe 2 maintains its three branches which remain connected along the same radial well 31 while having lengths measured on the new tread surface, L1', L2', L3' respectively, which are shorter than the respective lengths L1, L2, L3 measured on the tread surface when new. The reductions in length are at least equal to 30% of the respective initial lengths: that means for example that L1' is less than 70% of L1. In the scenario depicted, the variations in length of the three branches are expressed as identical percentages. These three branches of the sipe remain present on the tread surface until the tread is completely worn.

Through this measure it is possible to strike a balance in operation both from a mechanical standpoint and from a thermal standpoint.

Figure 3:
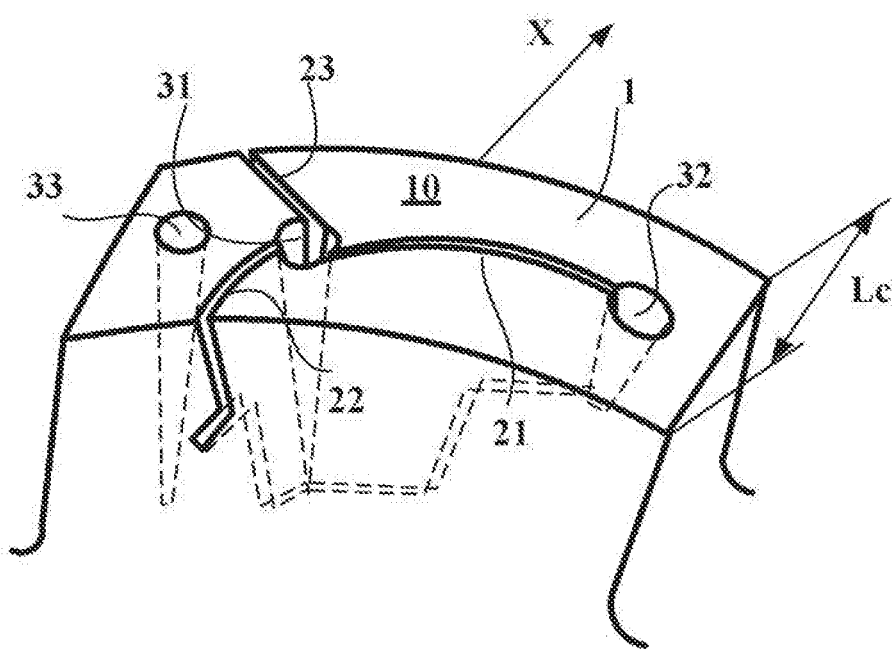
FIG. 3 shows a view of a block of a tread when new according to another alternative form.

FIG. 3 shows, in another alternative form of the disclosure, a block 1 of a tread when new, this block being provided with a three-branch sipe 2. In this alternative form, the well 31 to which the three branches 21, 22, 23 of the sipe 2 are connected has a cross section of circular shape with a diameter equal to three times the mean width of each branch of the sipe, this width being measured on the tread surface when new. The cross-sectional diameter of the well 31 on the tread surface when new is comprised between 10% and 20% of the circumferential length Lc of the block 1.

In this layout, the three branches 21, 22, 23 are interconnected via this well 31 while at the same time being slightly offset from the center of the circle of the cross section of the well.

Furthermore, the first branch 21 of the sipe 2 ends inside the block 1 in a second radial well 32 of cross section similar to that of the well 31 to which the three branches of the sipe are connected. In combination with these two wells, a third well 33 is formed in that part of the element that is delimited by the second and third branches of the sipe and has no other sipe. This third well 33 is not connected to the sipe and its purpose is to balance the block from a mechanical and thermal standpoint. For preference, the wells 31, 32, 33 used here are frustoconical in shape, namely have a cross section that decreases with tread wear so as to avoid trapping foreign bodies that could potentially damage the tread.

The disclosure described with these examples is not limited to these examples alone and various modifications may be made thereto without departing from the scope defined by the claims. In particular, the blocks may be bounded by grooves of curvilinear geometries and in such cases the sipes may adopt curvilinear geometries rather than the rectilinear geometries shown in FIGS. 1 to 3.

What is claimed as:

1. A tread for a tire for a construction plant vehicle, this tread having a surface-13 referred to as tread surface—intended to come into contact with the ground when the tire is running, this tread having a wearable thickness of material at least equal to 60 mm and comprising on its tread surface a tread pattern design formed of a plurality of blocks of material, each block being delimited by transverse or oblique grooves—which means to say grooves making an angle at least equal to 45 degrees with the circumferential direction—and circumferential grooves, wherein a plurality of the blocks are provided with a sipe having three incised branches, these three branches having one end in common, a first branch being oriented in a transverse or oblique direction, a second branch and a third branch each opening when new into a transverse groove delimiting the block, each sipe being such that the angle formed between the first branch and the second branch is at least equal to 100 degrees and at most equal to 125 degrees and such that the angle formed between the first branch and the third branch is at least equal to 100 degrees and at most equal to 125 degrees, this sipe being, after wear representing between 45% and 70% of the total wearable thickness, such that the lengths of the three branches measured on the new tread surface, L1', L2', L3' respectively, are shorter than the lengths L1, L2, L3 respectively measured on the tread surface when new, and the reductions in length are at least equal to 30% of the respective initial lengths.

2. The tread according to claim 1 wherein the reductions in length of the branches of the sipes are at least equal to 30% and at most equal to 60% of the respective initial lengths of each branch.

3. The tread according to claim 1 wherein after wear representing more than 95% of the total wearable thickness, the lengths of the three branches measured on the new tread surface, respectively L1", L2", L3" are shorter than the initial lengths—L1, L2, L3 respectively—measured on the tread surface when new.

4. The tread according to claim 1 wherein the first branch comprises, on the tread surface when new, two ends one of which is common to the other two branches and another of which is situated axially between the common end and the equatorial midplane of the tire.

5. The tread according to claim 4 wherein the first branch of the sipe is provided at its end not common to the other two branches with a well of a diameter greater than the width of the first branch so as to reduce the stresses at this end and encourage the removal of heat produced in the tread during running, this well extending depthwise at least as far as the reduction in length of the first sipe incision.

6. The tread according to claim 5 wherein in order to encourage the removal of the heat generated in the tread, the well formed at the end of the first branch that is not common to the other two branches has a depth at least equal to 30% of the total wearable thickness.

7. The tread according to claim 1 wherein the depths from which the lengths of the second and third branches of the sipes are reduced differ from one another so as to increase the movement of air in these branches and thus increase the removal of heat.

8. The tread according to claim 1 wherein, when new, the three branches of the sipe interconnect at a well with a maximum surface dimension at least equal to 10% and at most equal to 20% of the circumferential length of the block.

9. The tread according to claim 8 wherein the well to which the three branches of the sipe are connected has a cross section that decreases with depth so as to limit the possibility of trapping foreign bodies liable to damage the tire provided with this tread.

10. The tread according to claim 1 wherein the second and third branches are provided with undulations in two directions whereas the first branch is provided with undulations in the depthwise direction.

* * * * *